United States Patent
Sato

(10) Patent No.: US 6,839,765 B1
(45) Date of Patent: *Jan. 4, 2005

(54) SYSTEM FOR TRANSFERRING MULTIMEDIA INFORMATION

(75) Inventor: Tomonobu Sato, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 749 days.

This patent is subject to a terminal disclaimer.

(21) Appl. No.: 09/666,554

(22) Filed: Sep. 21, 2000

Related U.S. Application Data

(63) Continuation of application No. 08/862,365, filed on May 23, 1997, now Pat. No. 6,173,328.

(30) Foreign Application Priority Data

May 28, 1996 (JP) ............................................. 8-133651

(51) Int. Cl.[7] .............................................. G06F 16/16
(52) U.S. Cl. ........................ 709/231; 709/217; 725/115
(58) Field of Search ............................... 709/217–219, 709/223, 224, 231, 232, 247, 203; 725/90, 96, 92, 113–115, 87, 91, 100; 348/715, 716; 711/113, 114

(56) References Cited

U.S. PATENT DOCUMENTS

| | | | |
|---|---|---|---|
| 5,005,122 A | 4/1991 | Griffen et al. ............... 364/200 |
| 5,351,276 A | 9/1994 | Doll, Jr. et al. ................ 379/67 |
| 5,528,281 A | 6/1996 | Grady et al. .................... 348/7 |
| 5,625,404 A | 4/1997 | Grady et al. .................... 348/7 |
| 5,629,732 A | 5/1997 | Moskowitz et al. ........... 348/7 |
| 5,712,906 A | 1/1998 | Grady et al. ............. 379/93.17 |
| 5,712,976 A | 1/1998 | Falcon, Jr. et al. ..... 395/200.09 |
| 5,721,815 A * | 2/1998 | Ottesen et al. ............... 345/721 |
| 5,721,878 A | 2/1998 | Ottesen et al. ............... 395/500 |
| 5,745,696 A | 4/1998 | Mendelson et al. ......... 709/233 |
| 5,751,883 A | 5/1998 | Ottesen et al. ......... 395/200.61 |
| 5,758,085 A * | 5/1998 | Kouoheris et al. .......... 709/231 |
| 5,793,980 A | 8/1998 | Glaser et al. ................ 709/231 |
| 5,805,804 A | 9/1998 | Laursen et al. ........ 395/200.02 |
| 5,805,821 A | 9/1998 | Saxena et al. ......... 395/200.61 |
| 5,878,212 A | 3/1999 | Civanlar et al. ....... 395/200.33 |
| 5,953,506 A | 9/1999 | Kaira et al. ................. 709/231 |
| 6,173,328 B1 * | 1/2001 | Sato ........................... 709/231 |

FOREIGN PATENT DOCUMENTS

| | | |
|---|---|---|
| JP | 8-289270 | 11/1996 |
| JP | 9-37212 | 2/1997 |

OTHER PUBLICATIONS

"Technical Trend Toward Video Server Served as Core of VOD," *Business Communication*, Nov. 1994.

* cited by examiner

*Primary Examiner*—William C. Vaughn, Jr.
(74) *Attorney, Agent, or Firm*—Antonelli, Terry, Stout & Kraus, LLP

(57) ABSTRACT

A multimedia information transfer system includes a multimedia server and a client server system coupled with the multimedia server through a communication network and transfers data transmitted from the multimedia server to a server of the client server system. The multimedia server stores data streams of the multimedia information and reproduces the information. The client requests the multimedia server to transfer data, stores the transferred data block and displays the stored data block concurrently with the storage of the next coming data block.

10 Claims, 12 Drawing Sheets

FIG. 4

TABLE FOR EACH TYPE OF PROCESS REQUEST

| PROCESS REQUEST TYPE INFORMATION 1 (62) | PROCESS REQUEST TYPE INFORMATION 2 (63) | PROCESS REQUEST TYPE INFORMATION 3 (64) | ... | PROCESS REQUEST TYPE INFORMATION m (65) |
|---|---|---|---|---|

| PROCESS REQUEST ID (66) | BACK-UP PROCESS FLAG (67) | CSS SERVER SERVICE TIME MAX VALUE (68) |
|---|---|---|

DATA SET FORMAT FOR TRANSMISSION
(MULTIMEDIA SERVER SIDE)

FIG. 9

MATRIX TABLE FOR MANAGING CSS STATUS
(MULTIMEDIA SERVER SIDE)

| CSS STATUS INFORMATION 1 (123) | CSS STATUS INFORMATION 2 (124) | CSS STATUS INFORMATION 3 (125) | ... | CSS STATUS INFORMATION m (126) |
|---|---|---|---|---|

Fields (for CSS STATUS INFORMATION 1):

- 127: NETWORK ADDRESS DEDICATED FOR INPUT OF MULTIMEDIA SERVER
- 128: NETWORK ADDRESS DEDICATED FOR OUTPUT OF MULTIMEDIA SERVER
- 129: NETWORK ADDRESS DEDICATED FOR INPUT OF CSS SERVER
- 130: NETWORK ADDRESS DEDICATED FOR OUTPUT OF CSS SERVER
- 131: NETWORK ADDRESS DEDICATED FOR INPUT OF CLIENT
- 132: NETWORK ADDRESS DEDICATED FOR OUTPUT OF CLIENT
- 133: PROCESS REQUEST DATE
- 134: PROCESS REQUEST TIME
- 135: PROCESS REQUEST ID
- 136: TRANSFER COMPLETION FLAG
- 137: FIRST DATA BLOCK RECEIVE FLAG
- 138: SECOND DATA BLOCK RECEIVE FLAG
- 139: N-TH DATA BLOCK RECEIVE FLAG

FIG. 10

SERVICE LIST (CSS SERVER SIDE)

| 180 | 181 | 182 | 183 |
|---|---|---|---|
| NETWORK ADDRESS 1 DEDICATED FOR OUTPUT OF CLIENT | NETWORK ADDRESS 2 DEDICATED FOR OUTPUT OF CLIENT | NETWORK ADDRESS 3 DEDICATED FOR OUTPUT OF CLIENT | NETWORK ADDRESS n DEDICATED FOR OUTPUT OF CLIENT |

FIG. 11

SERVICE LIST (MULTIMEDIA SERVER SIDE)

| 184 | 185 | 186 | 187 |
|---|---|---|---|
| NETWORK ADDRESS 1 DEDICATED FOR OUTPUT OF CSS SERVER | NETWORK ADDRESS 2 DEDICATED FOR OUTPUT OF CSS SERVER | NETWORK ADDRESS 3 DEDICATED FOR OUTPUT OF CSS SERVER | NETWORK ADDRESS n DEDICATED FOR OUTPUT OF CSS SERVER |

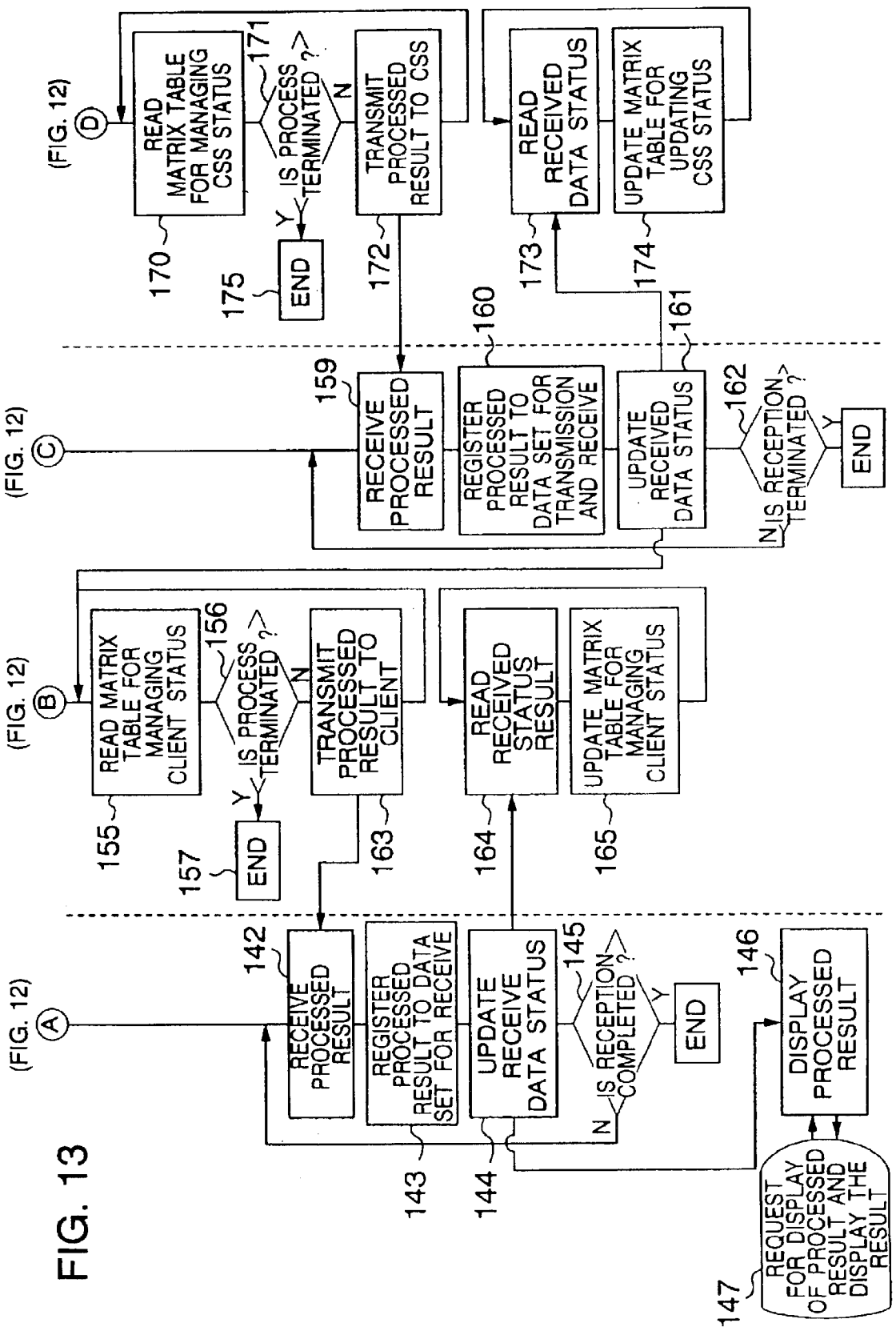

SYSTEM FOR TRANSFERRING MULTIMEDIA INFORMATION

CROSS-REFERENCE TO RELATED APPLICATION

This is a continuation of application Ser. No. 08/862,365, filed May 23, 1997 now U.S. Pat. No. 6,173,328.

BACKGROUND OF THE INVENTION

The present invention relates to a system for transferring multi-media information. The multimedia information is a generic term for several kinds of digital information coexisting in one information media, those digital information including digital moving pictures, digital still pictures, digital text data, and digital audio data. More particularly, the present invention relates to the multimedia information transfer system which is suitable to transferring data from a multimedia server for generating large amounts deal of multimedia information having streams with high bit rates to a server and a client coupled in a client server system (termed CSS) through a multimedia information network represented as a CATV network or an internet.

In general, the CSS used for business is arranged so that part of work to be processed by a server of the CSS is given to a multimedia server such as an outsourcing center and the processed result is given back to the CSS through a network.

The multimedia server, to which part or all of the functions about a project are including, setup, and a promotion of an information processing system used for business in an enterprise is required to process a large amount of data streams with high bit rates in order to make good use of the multimedia information for backing up the processing of the CSS. Hence, the multimedia server is generally arranged by the leased hardware, a supercomputer (super parallel machine), a mainframe, a general-purpose server machine, a configuration of standard computers interconnected with one another (distributed architecture), or the like.

This kind of technology is described in "Technical Trend Toward Video Server Served as Core of VOD" of "Business Communication" November 1994, issued by Business Communication, Ltd., for example.

When transferring data between different kinds of information processing systems coupled through a communication network, an extended waiting time for access to the communication network is a significant problem. In particular, when transferring a large amount of data such as multimedia information, the waiting time for access and the transfer time are bottlenecks with regards to efficiency of the transfer system.

The technology described in the aforementioned publication has difficulty in overcoming the bottleneck in connection with the network and in quickly and efficiently transferring data between the multimedia server and a plurality of CSS servers and between the CSS server and a plurality of clients. These difficulties makes it impossible for a client for using the data transferred thereto to sufficiently meet the requirements of receiving a large amount of data streams with high bit rates in real time and performing reproducing processes of the multimedia information represented as image data, those reproducing processes including a fast feed, a stop, and a reverse like reproduction of a video disk, for example.

SUMMARY OF THE INVENTION

It is an object of the present invention to provide a system for transferring multimedia information in a system including of a multimedia server, CSS servers, and clients, the system being arranged to simplify transmitting processes between the multimedia server and the CSS server and receiving processes between the CSS server and to the client and solve a bottleneck in connection with a network between the CSS server and a plurality of clients for the purpose of keeping the data transfer quick and efficient.

According to the present invention, a multimedia information transfer system includes a multimedia server and a client server system coupled with the multimedia server through a network so that the multimedia server transfers data to a server and clients of the client server system, the multimedia server having means for storing and reproducing data streams of the multimedia information, the client having means for requesting the multimedia server to output data and storing the transferred data and means for displaying the data concurrently when storing the data.

According to an aspect of the present invention, the multimedia server operates to divide the multimedia information into N data blocks (N is an integer of 2 or more), each of which contains n data units (n is an integer of 1 or more), and sequentially transfer the data units to the server of the client server system on the data blocks. Then, the client server system operates to transmit the data block containing n data units to the client for requesting the server to output the data.

Further, according to another aspect of the present invention, each network node of the multimedia server and the server and the clients of the client server system has network addresses dedicated for the receipt and transmission of data. The multimedia serve and the server of the client server system, which transmit the multimedia information, have their own matrix tables each for managing a receiving status and a process request status on the receiving side and operate to set the request from the receiving side to a field of the matrix and transfer the data based on the status.

According to another aspect of the present invention, the client requesting the process receives data at the address defined on the receiving side the multimedia information, which is processed by the multimedia server, the data being divided into N data blocks and transferred in groups of n data units in each data block, and a group of n data units being sent to the defined address. Further, the client provides a function of displaying the streams of the multimedia information concurrently while storing the streams of data. The client enables concurrent storage and display of the data streams so that the client, by itself, can control a fast feed, a stop, a reverse, and a play in real time.

The multimedia server has a matrix table for managing a process requesting status from the side for requesting the process and a receive status for the processed result data for each service. When the side for requesting the process operates to set the process requesting status and the receive status to the matrix table of the multimedia server, the matrix table reads these statuses in sequence and sets the statuses to the proper fields for the matrix table. Hence, the multimedia server for providing the service is capable of transmitting the processed result data for the services of the CSS server and the clients as viewing the status of the matrix table independently of the update of the matrix table.

Further, according to another aspect of the present invention, as mentioned above, the data transfer is executed between the CSS server and the client. Further, the status management of the matrix table and the transmission of the processed result data are allowed to be executed by the device for providing the multimedia server and the CSS server with the services. Hence, the multimedia server, the CSS server, and the client are capable of doing their performing processes independently of one another and the two former servers can meet the request from the client and transfer the processed result data.

BRIEF DESCRIPTION OF THE DRAWINGS

These and other objects, features, and advantages of the present invention will become more apparent upon a reading of the following detailed description and drawings, in which:

FIG. 4 is a view showing a format of a table for each type of process requests for a CSS server;

FIG. 9 is a view showing a format of a matrix table for managing a CSS status for a multimedia server;

FIG. 10 is a view showing a list of objects to be served for a CSS server;

FIG. 11 is a view showing a format of objects to be served for a multimedia server;

FIG. 13 is a flowchart (part 2) to be combined with the flowchart of FIG. 12, showing a processing operation of a system for transferring multimedia information according to an embodiment of the present invention.

DESCRIPTION OF THE PREFERRED EMBODIMENTS

Hereafter, the description will be oriented to a system for transferring multimedia information according to an embodiment of the present invention.

Figure 1:
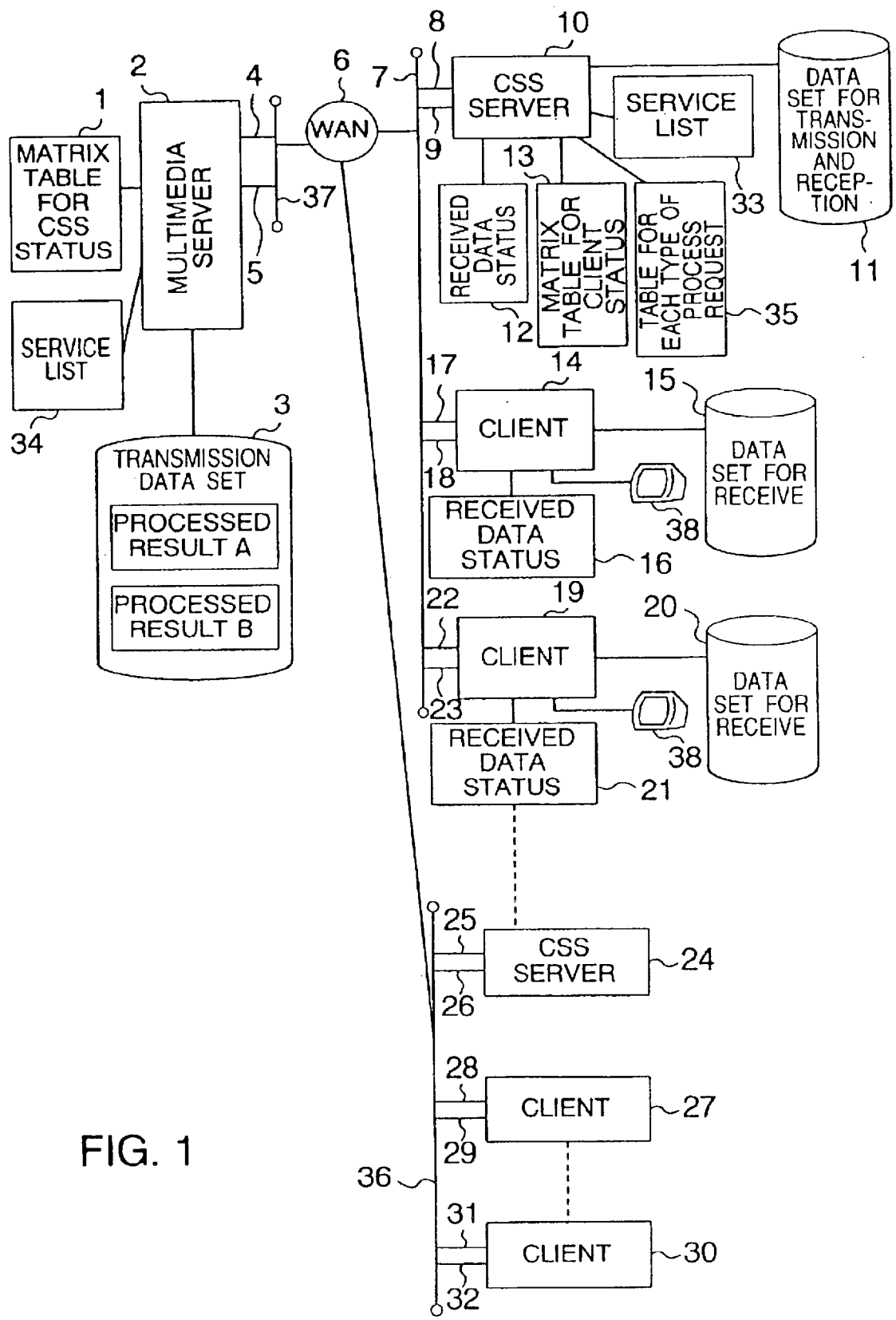
FIG. 1 is a block diagram showing an arrangement of a system for transferring multimedia information according to an embodiment of the present invention.

In FIG. 1, a numeral 1 denotes a matrix table for managing a CSS status. A numeral 2 denotes a multimedia server. A numeral 3 denotes a disk unit for storing a data set to be transmitted. Numerals 4, 9, 18, 23, 26, 29 and 32 denote LAN adapters provided with network addresses dedicated for transmission. Numerals 5, 8, 17, 22, 25, 28 and 31 denote LAN adapters provided with network addresses dedicated for receive. A numeral 6 denotes a communication network, specifically a wide area network (WAN) which is larger in scale than the LAN. Numerals 7, 36, and 37 denote interface devices coupled through the LAN. Numerals 10 and 24 denote CSS servers. A numeral 11 denotes a harddisk where a data set to be received or transmitted is registered. Numerals 12, 16 and 21 denote statuses for received data. A numeral 13 denotes a matrix table for managing a client status. Numerals 14, 19, 27 and 30 denote clients. Numerals 15 and 20 denote harddisks a received data set is registered. A numeral 38 denotes a display unit coupled to each client.

Moreover, the network addresses dedicated for transmission of the LAN adaptors 4, 9, 18, 23, 26, 29 and 32 may be made to be identical with the network addresses dedicated for receive of the LAN adaptors 5, 8, 17, 22, 25, 28 and 31. That is, one LAN adaptor having a single network address may have both of the transmitting and receiving functions.

The system according to an embodiment of the invention, as shown in FIG. 1, includes devices on the multimedia server side for backing up the CSS and a plurality of devices on the CSS side coupled through the network 6 such as the WAN and LAN devices 37, 7 and 36.

The devices on the multimedia server side includes the multimedia server 2 for backing up the CSS, the matrix table 1 for managing the statuses of the processes requested by the CSS side coupled to this server 2 and of the processed result data, a disk device 3 for storing a data set of the processed result to be transmitted to the CSS side, a service list 34 where the CSS's to be served are registered at network addresses dedicated for the outputs, and the LAN adaptors 4 and 5 coupled to the LAN device 37.

One of the devices on the CSS side is arranged to have the CSS server 10 and the clients 14 and 19 coupled through the LAN adaptors 8, 9, 17, 18, 22, and 23 and the LAN device 7. The CSS server 10 is coupled to the disk device 11 for storing a data set of the processed result received from the multimedia server 2 and another data set to be transmitted to the client, a received data status 12, a table for each type of processed request, and the service list 33. The clients 14 and 19 are coupled to the disk devices 15 and 20, respectively, for storing the data sets of the processed result received from the multimedia server 2 and the received data statuses 16 and 21. The CSS server 24 and the clients 27 and 30 on the CSS side have the same arrangement as the foregoing devices on the CSS side.

In turn, the description will be oriented to the formats of the tables, the lists, the statuses and the like coupled to the foregoing multimedia server 2, the CSS server 10, and the clients 14 and 19, respectively, with reference to the appended drawings.

Figure 2:
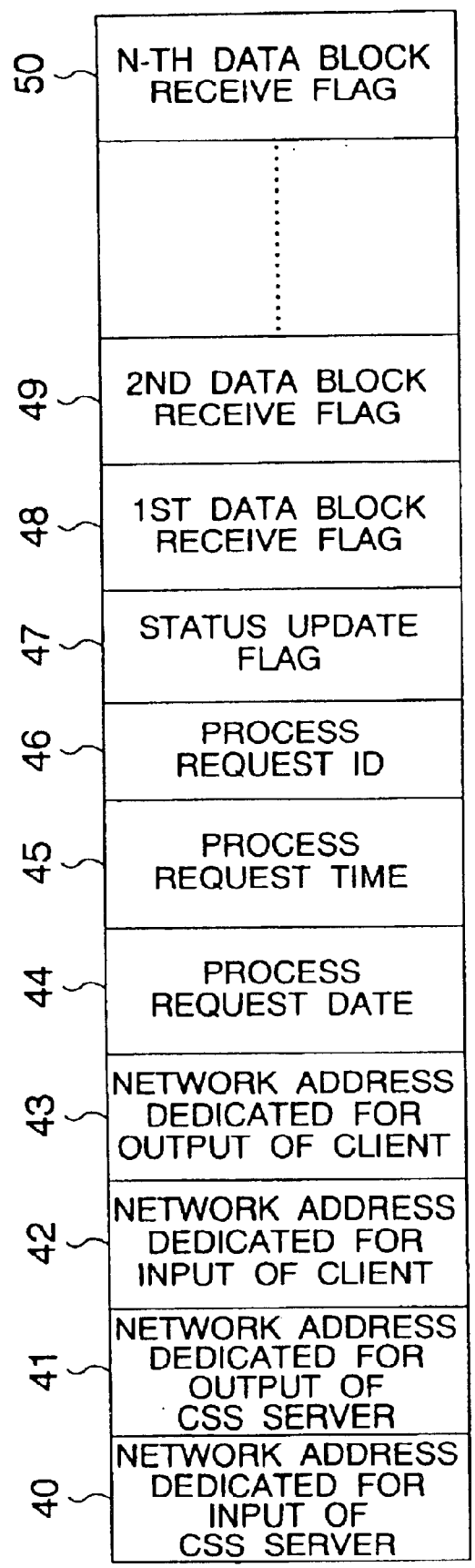
FIG. 2 is a view showing a format of a received data status for a client.

The received data statuses 16 and 21 coupled to the clients 14 and 19 are referenced and updated when the client requests the CSS server to perform a process and receive the data blocks of the processed result. As shown in FIG. 2, the status 16 or 21 is composed of network addresses 40 to 43 dedicated for input and output of the CSS server and the subject client, a process request date 44, a process request time 45, a process request ID 46, a status update flag 47, and receive flags 48 to 50 for the first to the N-th data blocks (N is an integer of 2 or more).

The network addresses 40 to 43 may use a single common network address for transmission and receipt of data in place of the network addresses dedicated for transmission and receive.

Figure 3:
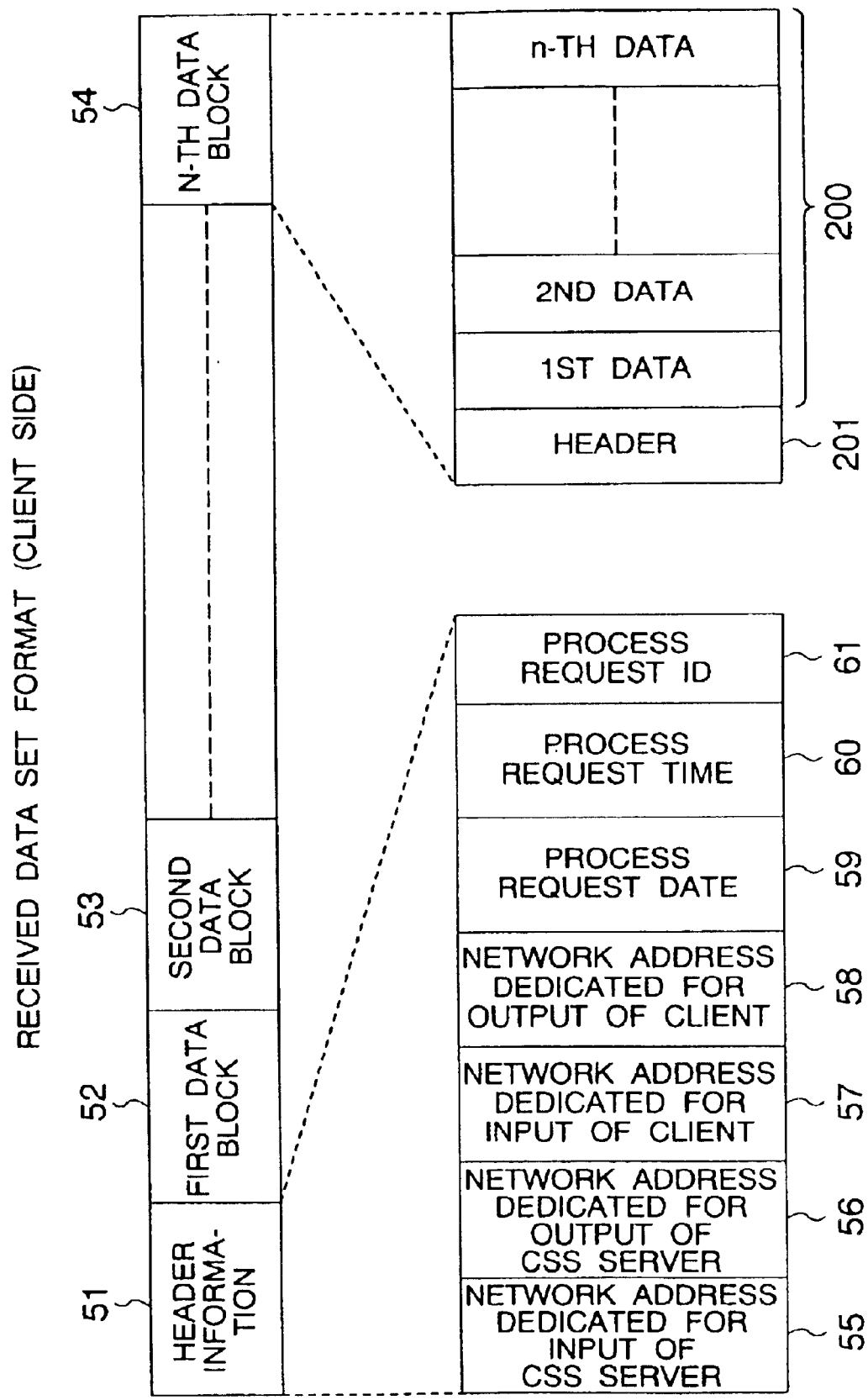
FIG. 3 is a view showing a format of a received data set for a client.

The received data set registered in the harddisk 15 or 20 has a format including header information 51 and the first to the N-th data blocks 52 to 54 as shown in FIG. 3. The header information 51 includes of network addresses 55 to 58 dedicated for inputs and outputs of the CSS server and the subject client, the process request date 59, the process request time 60, and the process request ID 61, which format is the same as that described with reference to FIG. 2.

Each data block includes n (n is an integer of 1 or more) data units 200 and a header 201 at the head of the data. The header 201 contains a data block number and a data unit number stored as address information.

The table for each type of process request 35 coupled to the CSS server 10, as shown in FIG. 4, enables the storage of m (m is an integer of 1 or more) pieces of information 62 to 65 for each type of process request. Each piece of information for each type of process request includes a process request ID 66 of a client, a backup processing flag 67, and a maximum value of a service time of the CSS server.

Figure 5:
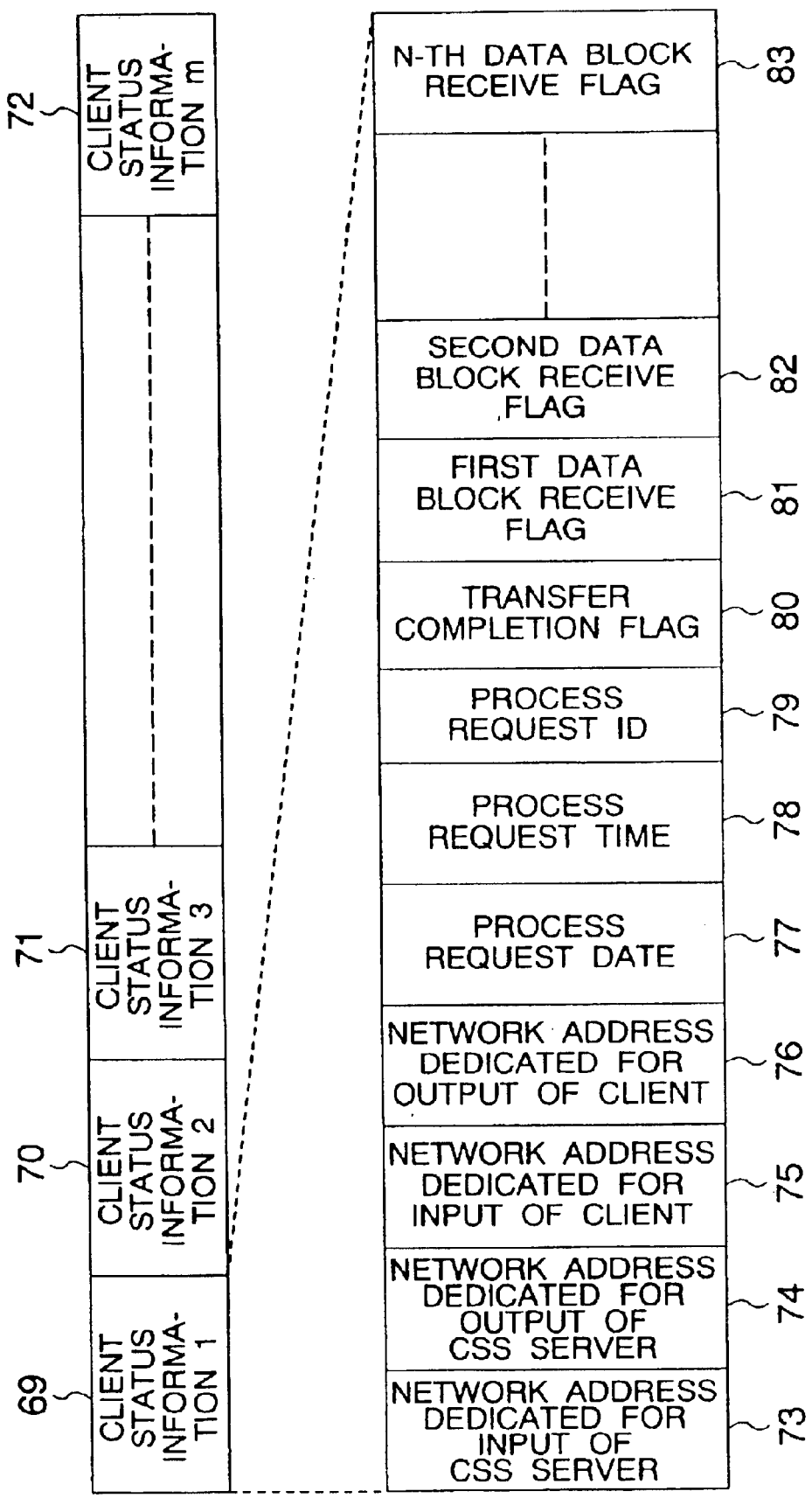
FIG. 5 is a view showing a format of a matrix table for managing a client status for a CSS server.

The matrix table 13 for managing a client status coupled with the CSS server 10, as shown in FIG. 5, enables the storage of m pieces of status information 69 to 72 for the process requests given by the clients. Each status information includes network addresses 73 to 76 dedicated for inputs and outputs of the CSS server and the clients, which are similar to the network addresses described with reference to FIG. 2, a process request date 77, a process request time 78, a process request ID 79, and receive flags 81 to 83 for the first to the N-th data blocks. The different aspect of FIG. 5 from FIG. 2 is the provision of a transfer completion flag 80 in place of a status update flag.

Figure 6:
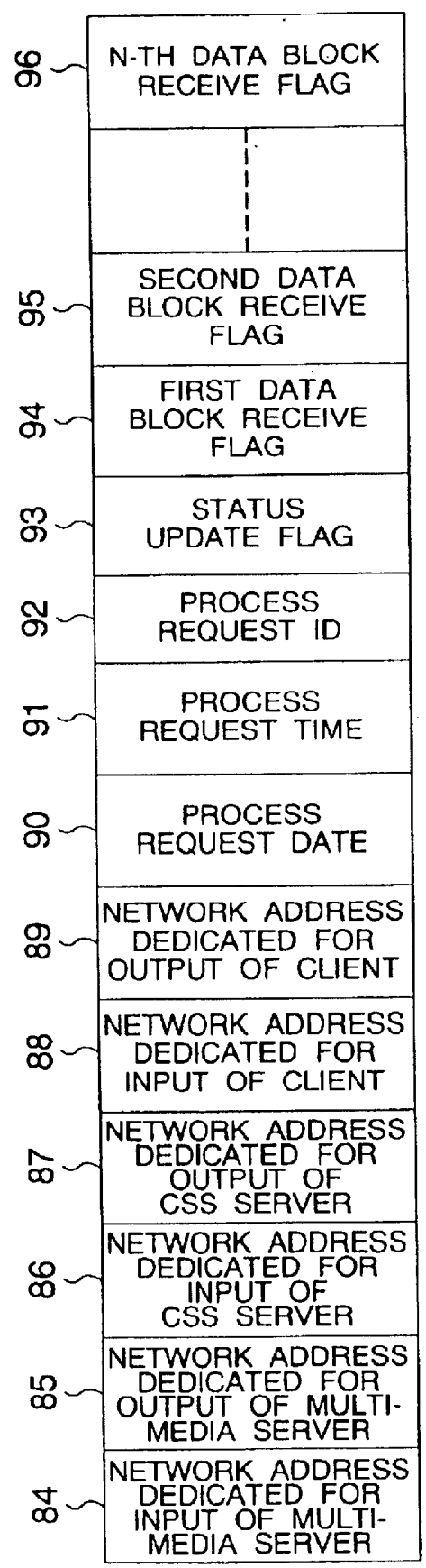
FIG. 6 is a view showing a format of a received data status for a CSS server.

The received data status 12 coupled to the CSS server 10, as shown in FIG. 6, is composed of network addresses 84 to 89 dedicated for inputs and outputs of the multimedia server, the CSS server, and the clients, a process request date 90, a process request time 91, a process request ID 92, a status update flag 92, and receive flags 94 to 96 for the first to the N-th data blocks.

Figure 7:
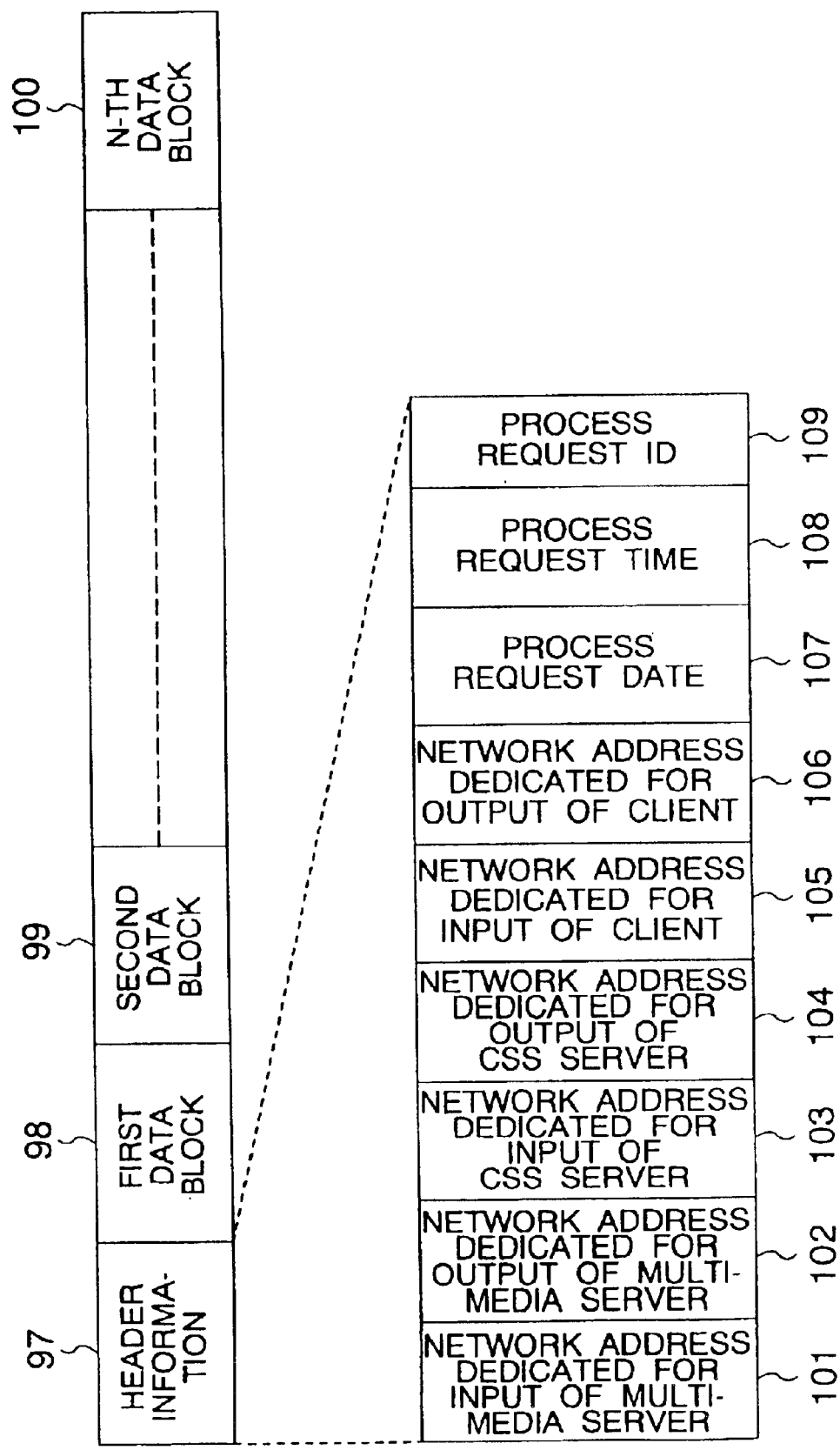
FIG. 7 is a view showing a format of a transmission and receive data set for a CSS server.

The data set for transmission and reception of data, registered in the disk device 11 coupled to the CSS server 10, has such a format as shown in FIG. 7. The format includes of a header information 97 and the first to the N-th data blocks 98 to 100. The header information 97 includes network addresses 101 to 106 dedicated for inputs and outputs of the multimedia server, the CSS server, and the clients, which are the same network addresses as those described with reference to FIG. 6, a process request date 107, a process request time 108, and a process request ID 109.

The service list 33 coupled to the CSS server 10, as shown in FIG. 10, enables the storage of n (n is an integer number.) network addresses 180 to 183 dedicated for outputs of the clients served by the subject CSS server 10.

Figure 8:
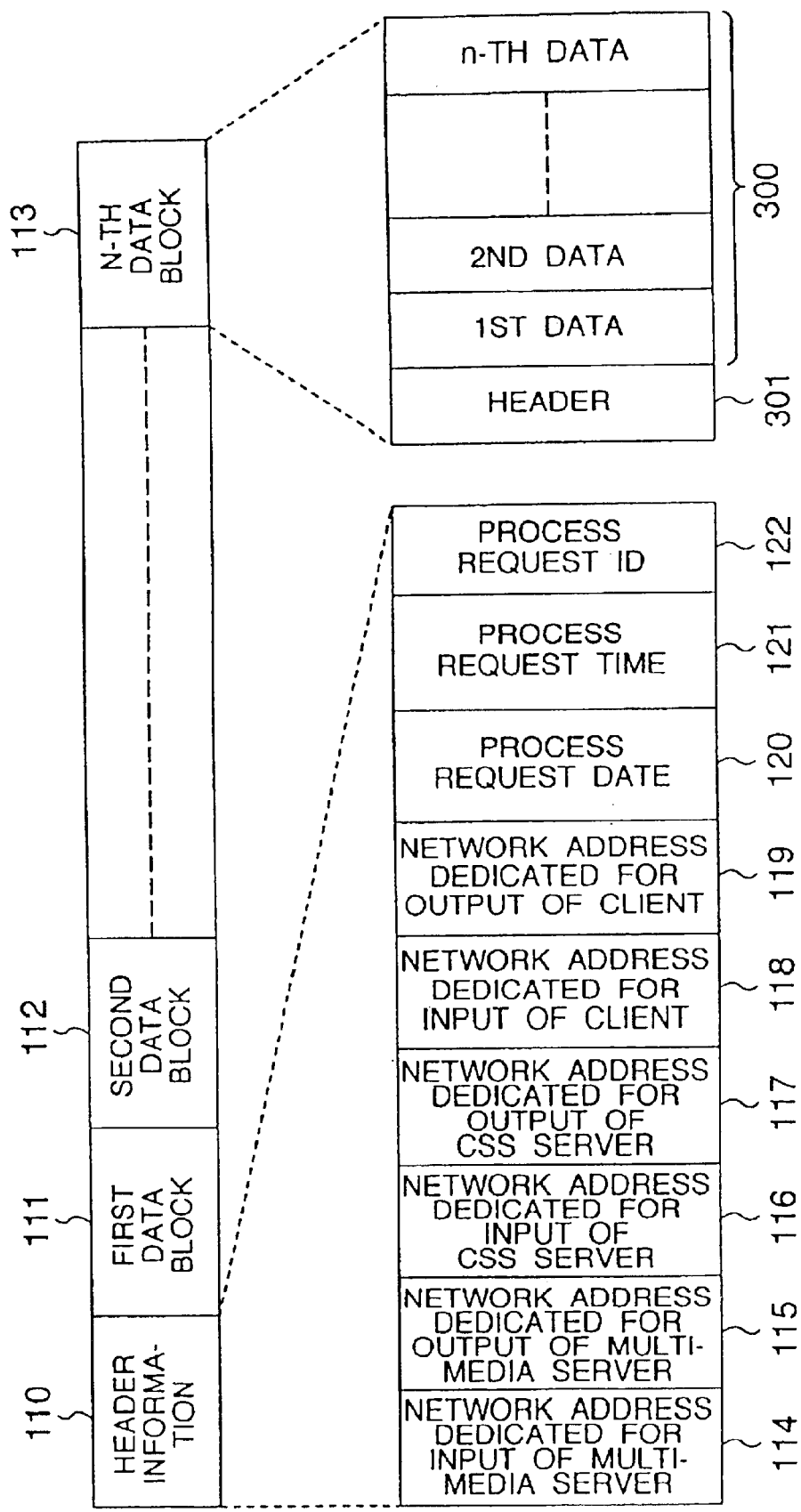
FIG. 8 is a view showing a format of a transmission data set for a multimedia server.

The data set for transmission included in the disk device 3, which stores the data set of the processed result to be transmitted to the CSS side coupled to the multimedia server 2, has such a format as shown in FIG. 8. The format includes header information 110 and the first to the N-th data blocks 111 to 113. The header information 110 is the same as that described with reference to FIG. 7. That is, the header information 110 includes of network addresses 114 to 119 dedicated for inputs and outputs of the multimedia server, the CSS server and the clients, a process request date 120, a process request time 121, and a process request ID 122.

Each data block includes n (n is an integer of 1 or more) data units 300. Further, a header 301 is included at the head of the data. The header 301 saves a data block number and a data unit number as address information.

The matrix table 1 for managing the CSS status, which table is coupled to the multimedia server 2, enables the storage of m pieces of status information 123 to 126 for the process requests given by the CSS servers as shown in FIG. 9. Each status information has similar composition to that described with reference to FIG. 5. That is, each status information includes of network addresses 127 to 132 dedicated for inputs and outputs of the CSS servers, the clients and the multimedia server, a process request date 133, a process request time 134, a process request ID 135, a transfer completion flag 136, and receive flags 137 to 139.

The service list coupled to the CSS server side, as shown in FIG. 10, enables the storage of n network addresses 180 to 183 dedicated for outputs of the clients served by the subject CSS server.

The service list 34 coupled to the multimedia server 2, as shown in FIG. 11, enables the storage of n network addresses 184 to 187 dedicated for outputs of the CSS servers served by the subject multimedia server 2.

As set forth above, according to an embodiment of the invention, the system configured of the multimedia server, the CSS server and the clients is arranged to simplify a transmitting process between the multimedia server and the CSS server and the receiving process between the CSS server and the clients and solve the bottleneck in networking between the multimedia server and CSS servers and between the CSS server and the clients for the purpose of quickly and efficiently transferring the data.

Figure 12:
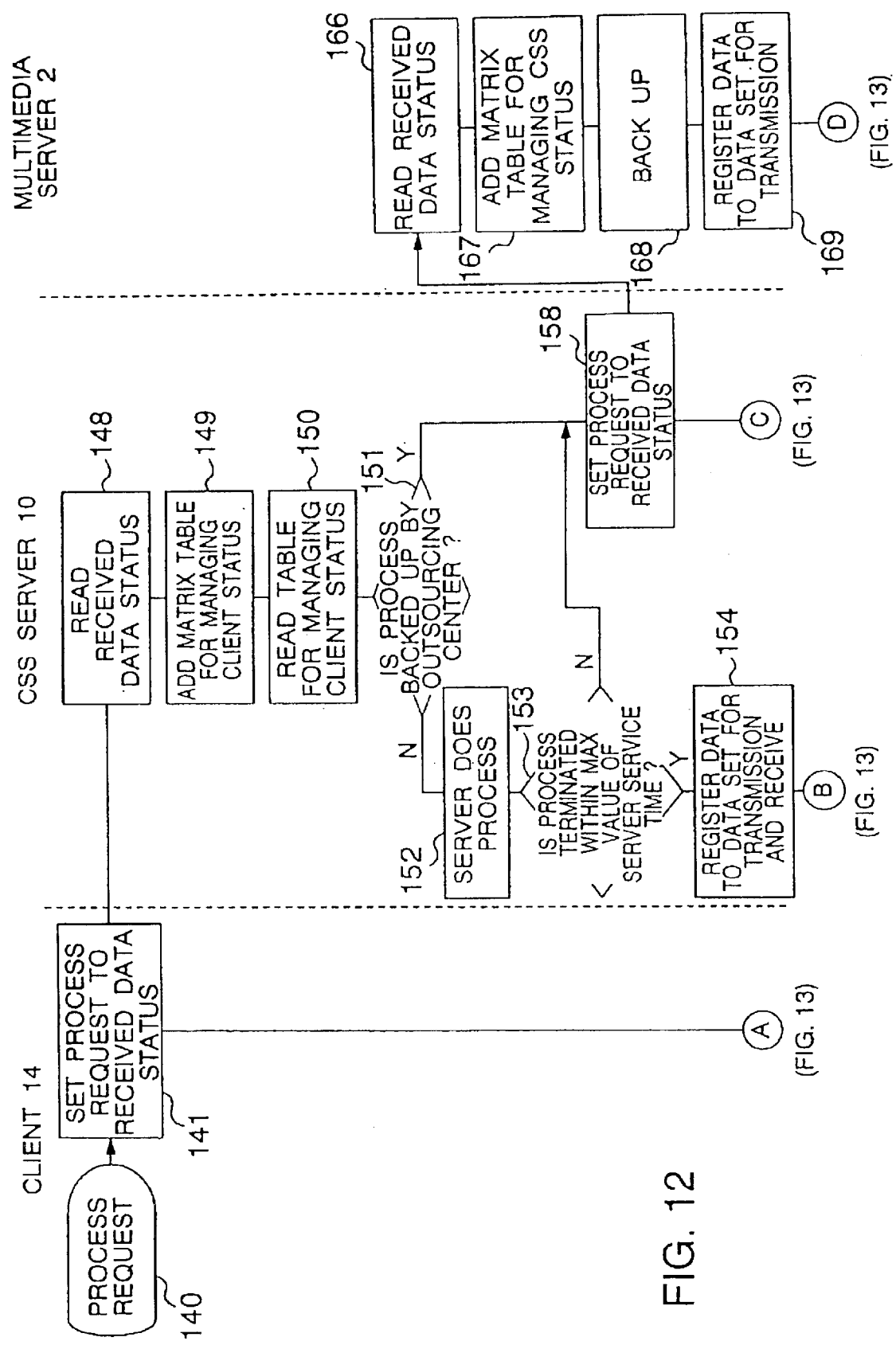
FIG. 12 is a flowchart (part 1) showing a processing operation of a system for transferring multimedia information according to an embodiment of the present invention.

In turn, the description will be oriented to the operation of transferring the multimedia information in the system according to the foregoing embodiment of the invention with reference to FIGS. 12 and 13. In this embodiment of the invention, the clients, the CSS server and the multimedia server are operated independently of one another. Further, the multimedia server operates to back up the process executed by the CSS server. In response to the request given from the CSS server, the multimedia server operates to transfer the multimedia information generated by the multimedia server itself to the CSS server. Further, the CSS server operates to transfer the received multimedia information to the client for requesting the multimedia information.

At first, the processing on the client side will be described.

(1) Now, assume that a process request is issued for transferring the multimedia information to the multimedia server 2. In response to the request, the client 14 operates to set a process request status to the received data 16 and waits for the processed result data transferred from the CSS server 10 (steps 140 and 141).

(2) As will be described below, the CSS server 10 performs the process requested by the client 14 or entrusts the process to the multimedia server 2. After obtaining the data of the processed result, the CSS server 10 or the multimedia server 2 operates to transfer the data to the client 14. The data of the processed result is divided into N data blocks, and each group of n data units of each data block is transferred back to the client 14 in sequence. The client 14 receives the processed result at each group of n data units (step 142).

(3) The process is executed for registering the processed result data received from the CSS server 10 in the harddisk 15 for storing the data set for receive (step 143). The received data status 16 is updated according to the receive status of the processed result data of the client 14 (step 144). Specifically, the data block receive flags for the statuses 48, 49, 50 and the like as shown in FIG. 2 are set, and the status update flag 47 is set as well.

When all n data units contained in one data block are received, in response to the display request from the display unit 38, n pieces of data units are displayed on the screen (steps 146 and 147). When the image information is displayed, as in the playback of a video disk, for example, the image section at any position is selectively displayed by specifying an address. Further, the still playback, the fast forwarding or the reversing are also made possible.

(4) It is checked if all N data blocks are received. If it is not completed, the process from the step 142 is repeated (step 145).

(5) In the check at the step 145, if the receipt of all N data blocks is completed, the process is terminated.

In addition, the client 14 enables to display the received data concurrently with the receipt of each group of n data units.

Next, the description will be oriented to the process executed by the CSS server.

(6) The CSS server 10 operates to sequentially read the received data statuses 16 and 21 of the client where the client itself sets the process request at the step 141 as referring to the service list 33 (step 148).

(7) After reading the received data status 16 set by the client 14 for the purpose of the process request at the step 141, the CSS server 10 operates to add the network address 40 dedicated for an input of the CSS server, the network address 41 dedicated for an output of the CSS server, the network address 42 dedicated for an input of the client, the network address 43 dedicated for an output of the client, the process request date 44, the process request time 45, and the process request ID 46, all of which are shown in FIG. 2, to the matrix table 13 for managing the client status as the data items 73 to 79 shown in FIG. 5. If the received data status 16 has no content, the record of the fact is added to the matrix table 13 (step 149).

(8) By reading the table 35 for each type of process request, it is checked if the request for the process is to be backed up by the multimedia server (steps 150 and 151).

(9) If it is determined that the request for the process is not to be backed up at the step 151, the process request is determined to be executed by the subject CSS server. In response to the process request from the client 14, the CSS server operates to perform the requested process (step 152).

(10) It is determined if the process at the step 152 is terminated within a MAX value 68 of the service time of the CSS server in the record set to the table 35 for each type of process request shown in FIG. 6 (step 153).

(11) If in the determination at the step 153 the process at the step 152 is terminated within the MAX value of the service time, the multimedia information created at the step 152 is divided into N data blocks and then are registered as the data set for transmission and receive in the disk 11 (step 154).

(12) If in the determination at the step 151 the process request ID 79 of the record added to the matrix table 13 for managing the client status at the step 149 is the same as the process request ID 66 contained in the process request table 35, the flag 67 for backing up the record is set, and the process request is determined to be the back-up request, or if in the determination at the step 153, the process at the step 152 is determined not to be terminated within the MAX value of the service time, the CSS server operates to set the process request read from the client to the received data status 12 shown in FIG. 6 and waits for the processed result data transferred from the multimedia server 2 (step 158).

(13) As will be described below, the multimedia server 2 performs the process requested by the CSS server 10 and, if the processed result data is obtained, transfers the data to the CSS server 10. The processed result data is divided into N data blocks, and each group of n data units contained in each data block is transferred to the CSS server one group by one group. The CSS server 10 receives the processed result at each group of n data units (step 159).

(14) The CSS 10 server performs a process for registering the processed result data received from the multimedia server 2 in the harddisk 11 for storing the data set for transmission and receive (step 160). Then, the CSS server 10 updates the received data status 12 according to the processed result data received status of the CSS server 10 itself (step 161). Specifically, the data block receive flags for the statuses 94, 96, 96 and the like shown in FIG. 6 are set and the status update flag 93 is set as well.

If all n data units are received in one data block at a step 161, the operation goes to a step 155, at which the content of the matrix table for managing the client status shown in FIG. 5 is read.

(15) It is checked that the receipt of all N data blocks is completed. If not completed, the process from the step 159 is repeated (step 162). If all N data blocks are received, the process is terminated.

(16) At a step 154 (see FIG. 12), the data of the processed result given by the subject CSS server 10 is registered in the harddisk 11 for storing the data set for transmitting and receiving. On the termination of the process, the matrix table 13 for managing the client status shown in FIG. 5 is read in sequence (step 155).

(17) If a transfer completion flag 80 in the matrix table 13 for managing the client status is set and all the receive flags from the first to the N-th data block receive flags 81 to 83 are set, the corresponding records are deleted from the matrix table 13 for managing the client status, and the process is terminated (steps 156 and 157).

(18) If it is determined that the transfer completion flag 80 is off by referring to the matrix table 13 for managing the client status, the process for transmitting standby data blocks at each group of n data units is executed by repeating the process from the step 155. On the termination of transferring all N data blocks, the transfer completion flag 80 is set (step 163).

(19) The received data statuses 16 and 21 updated by the client 14 at the step 144 are read in sequence (step 164).

(20) The content of the received data status 16 is checked. If the status update flag 47 is set, the matrix table 13 for managing the client status is updated and if the transfer of the N data blocks is terminated, the transfer completion flag 80 is set. If the flag 47 has been already off, nothing is executed (step 165).

Of the foregoing processes of the CSS server, the processes at the steps 155 to 157 and 163 are executed in parallel to and independently of the processes at the steps 164 and 165.

In turn, the description will be oriented to the process of the multimedia server.

(21) The multimedia server 2 operates to sequentially read the received data status 12 of the CSS server where the process request is set by the CSS server itself at the step 158 by referring to the service list 34 (step 166).

(22) The multimedia server 2 operates to read the received data status 12 of the client set by the CSS server 10 for the process request at the step 158 and to add a record composed of the network address 127 dedicated for an input of the multimedia server, the network address dedicated for an output of the multimedia server, the network address 129 dedicated for an input of the CSS server, the network address 130 dedicated for an output of the CSS server, the network address 131 dedicated for an input of the client, the network address 132 dedicated for an output of the client, the process request date 133, the process request time 134, the process request ID (Identification Information) 135 to the matrix table 1 for managing the CSS status shown in FIG. 9. If the received data status 12 has no content, the record of the fact is added. Then, the update flag 93 is off (step 167).

(23) In response to the process request issued by the CSS server 10, the multimedia server perform to a backup operation, divides the created multimedia information into N data blocks, and registered them as a data set for transmission in the disk 3 (steps 168 and 169).

(24) The multimedia server operates to sequentially read the matrix table 1 for managing the CSS status shown in FIG. 9 updated at the step 167 (step 170).

(25) If the transfer completion flag 136 included in the matrix table 1 for managing the CSS status is set and all receive flags from the first to the N-th data block receive flags 137 to 139 are set, the corresponding records are deleted from the matrix table 1, and then the process is terminated (steps 171 and 175).

(26) If it is determined that the transfer completion flag 136 is off by referring to the matrix table 1, the process for transmitting the standby data blocks to the corresponding CSS sever 10 at each group of n data units is executed by repeating the process from the step 170. On the termination of all N data blocks, the transfer completion flag 136 is set (step 172).

(27) The multimedia server operates to sequentially read the received data status 12 of the CSS server which is updated by the CSS server 10 at the step 161 (step 173).

(28) The content of the received data status 12 is checked. If the status update flag 93 is set, the multimedia server updates the matrix table 1 for managing the CSS status. If the transfer of all N data blocks is completed, the transfer completion flag 136 is off. If the flag 136 has been already off, nothing is executed (step 174).

Of the foregoing processes of the multimedia server, the processes at the steps 170 to 172 are executed in parallel to and independently of the processes at the steps 173 and 174.

In the foregoing embodiment of the invention, the client for issuing the process request is just required to receive the multimedia information from the multimedia server at the address defined on the receives side and set each group of n data units to the address. As mentioned above, the multimedia information is the result processed by the multimedia server. The multimedia information is divided into N data blocks and is transferred at each group of n data units of each data block. Further, the streams of the multimedia information are allowed to be displayed concurrently when those streams are stored. The storage of streams of multimedia data at each group of n data units being received is executed in parallel with and concurrently with the display of one previous received group of n data units. Like the playback of the video disk, the client thus provides a capability of controlling a fast feed, a stop, a reverse, a playback of the multimedia information in real time The multimedia server includes a matrix table for managing the process request status and the processed result data received status from the side for requesting the process at each service. When the requesting side sets the process request status and the processed result data received status from the requesting side, the multimedia server operates to sequentially read these statuses and set the statuses to the corresponding fields of the matrix table. The multimedia server that is a provider of the service enables the transmission of the processed result data to the service such as the CSS server or the client as viewing the status of the managing matrix table independently of the update of the matrix table.

Further, according to the embodiment of the invention, the data transfer between the CSS server and the client is made possible like the foregoing operation. The multimedia server, the CSS server, and the client are executing their processes independently of one another while the process request and the processed result data are transferred among the CSS server, the multimedia server, and the client.

As set forth above, according to the present invention, the data of the result processed by the multimedia server is divided into N data blocks and each group of n data units of each data block is transferred to the address defined by the receiving side. The multimedia server, the CSS server, and the client are thus capable of executing their processes independently of one another. Hence, the multimedia server, the CSS server, and the client are reduced in scale as securing a response to the request from the client.

In case the multimedia server is coupled to two or more CSS servers or the CSS server is coupled to two or more clients, the system according to the invention can solve the bottleneck in networking between the multimedia server and the CSS servers and between the CSS server and the clients. Further, according to the present invention, only the side for transmitting the processed result data, such as the multimedia server or the CSS server, operates to transmit the data. Hence, the CSS arrangement may be dynamically changed. Besides, even in this case, the present invention offers an effect that the client side does not need any modification.

While the present invention has been described above in conjunction with preferred embodiments, one of ordinary skill in the art would be enabled by this disclosure to make various modifications to these embodiments and still be within the scope and spirit of the invention as defined in the appended claims.

What is claimed is:

1. A process of transferring multimedia information in a multimedia information transfer system which comprises a multimedia server, a client server coupled to said multimedia server for status management, said process comprising the steps of:

storing and reproducing, at said multimedia server, data streams of multimedia information;

dividing said multimedia information, at said multimedia server, into N data blocks (where N is an integer no less than 2), and each of which N data blocks includes n data units (where n is an integer no less than 1), sequentially transferring said multimedia information into N data blocks to said client server on a data block basis, and sending a request to transfer said multimedia information divided into N data blocks from said client server to a proper field of said matrix table;

requesting, at said client server, said multimedia server to divide said multimedia information into N data blocks and to transfer N data blocks of said multimedia information to said client server; and storing and registering, at said client server, the transferred data blocks f said multimedia information, and providing a visual display of said multimedia information concurrently with the storage and registration of said multimedia information, wherein said multimedia information divided into N data blocks is transferred from said multimedia server to said client server independently of the update of said transfer and receive status areas of said matrix table.

2. The process as claimed in claim 1, wherein said multimedia server, said client server and one or more clients correspond to different nodes in said network having network addresses dedicated for communications.

3. The process as claimed in claim 2, wherein said network addresses dedicated for communications includes one network address dedicated for receiving said multimedia information, and another network address dedicated for transmitting said multimedia information.

4. The process as claimed in claim 1, wherein said matrix table is configured for managing a receiving status and a process request status of said client server, and wherein said multimedia server sets a request for transferring multimedia information divided into N data blocks from said client server to a proper field of said matrix table and transfers said multimedia information divided into N data blocks based on said received status.

5. The process as claimed in claim 1, wherein said matrix table includes a transfer status area which indicates whether the transfer of all N data blocks of said multimedia information is complete, and a receive status area which indicates the reception of said multimedia information, wherein said transfer and receive status areas are updated each time transfer and reception operations are executed.

6. The process as claimed in claim 1, wherein said multimedia information divided into N data blocks, each of said data blocks includes an address for identifying a subject data block, and each of n data units included in each data block includes a data address.

7. The process as claimed in claim 1, wherein said multimedia information includes image information, and when said image information is transferred from said multimedia server to one or more clients, said one or more clients operates to specify an address for identifying said data blocks if said image information stored and a data address of a specific one of said data units for reproducing said image information.

8. A process of transferring multimedia information from a multimedia server to a client server through a communication network, comprising:

dividing said multimedia information into N data blocks (where N is an integer no less than 2), each of which data block contains n data units (where n is an integer no less than 1), in response to a request by said client server that said multimedia server transfer said multimedia information divided into N data blocks, each bock containing n data units, to said client server;

transferring the requested data blocks of said multimedia information to said client server on a data block basis; and providing a matrix table having a transfer status area which indicates if a transfer operation of all N data blocks of said multimedia information is complete and a receive status area which indicated if a receive operation of all N data blocks of said multimedia information transferred from said client server is complete, the transfer operation of said multimedia information divided into N data blocks being executed based on status information of said matrix table, wherein said multimedia information divided into N data blocks is transferred from said multimedia server to said client server independently of the update of said transfer and receive status areas of said matrix table.

9. The process as claimed in claim 8, wherein said multimedia information divided into N data blocks, each of said data blocks includes an address for identifying a subject data block, and each of n data units included in each data block includes a data address.

10. The process as claimed in claim 8, wherein said multimedia information includes image information, and when said image information is transferred from said multimedia server to said client server, said client server operates to specify an address for identifying said data blocks of said image information stored and the data address of a specific one of said data units for reproducing said image information.

* * * * *